G. A. SCHEEFFER.
ELECTRIC METER.
APPLICATION FILED JAN. 14, 1910.

989,298.

Patented Apr. 11, 1911.

Witnesses
Milton Lenoir
Leonard W. Novander

Inventor
Gustave A. Scheeffer
By Browne Williams
Attorneys.

UNITED STATES PATENT OFFICE.

GUSTAVE A. SCHEEFFER, OF INDIANAPOLIS, INDIANA, ASSIGNOR TO COLUMBIA METER COMPANY, OF INDIANAPOLIS, INDIANA, A CORPORATION OF INDIANA.

ELECTRIC METER.

989,298.    Specification of Letters Patent.    Patented Apr. 11, 1911.

Application filed January 14, 1910. Serial No. 538,033.

*To all whom it may concern:*

Be it known that I, GUSTAVE A. SCHEEFFER, a citizen of the United States, residing at Indianapolis, in the county of Marion and State of Indiana, have invented a certain new and useful Improvement in Electric Meters, of which the following is a full, clear, concise, and exact description, reference being had to the accompanying drawings, forming a part of this specification.

My invention relates to an improved form of electricity meters adapted to measure a quantity of electricity flowing through any given circuit.

My improved meter construction provides for accuracy of operation, ease of inspection and repair and durability of working parts.

My invention consists particularly in an improved form of bracket construction for supporting the permanent magnets used to retard the rotation of the armature of a meter of the class referred to. These brackets are formed preferably of sheet metal and of reinforcing members associated with them which are also formed preferably of sheet metal and these reinforcing members are disposed in the angles of the brackets which are subjected to the greatest bending strain. Screws extend through the reinforcing members in two directions, the screws which pass in one direction extending also through the bracket into the base plate of the meter, while the screws which extend in the other direction pass through the outstanding portion of the brackets and into engagement with clamping plates which, together with the brackets serve to secure the permanent magnets in proper position. Dowel pins are provided to properly hold the brackets in the exact position they should occupy upon the base plate.

Figure 1:
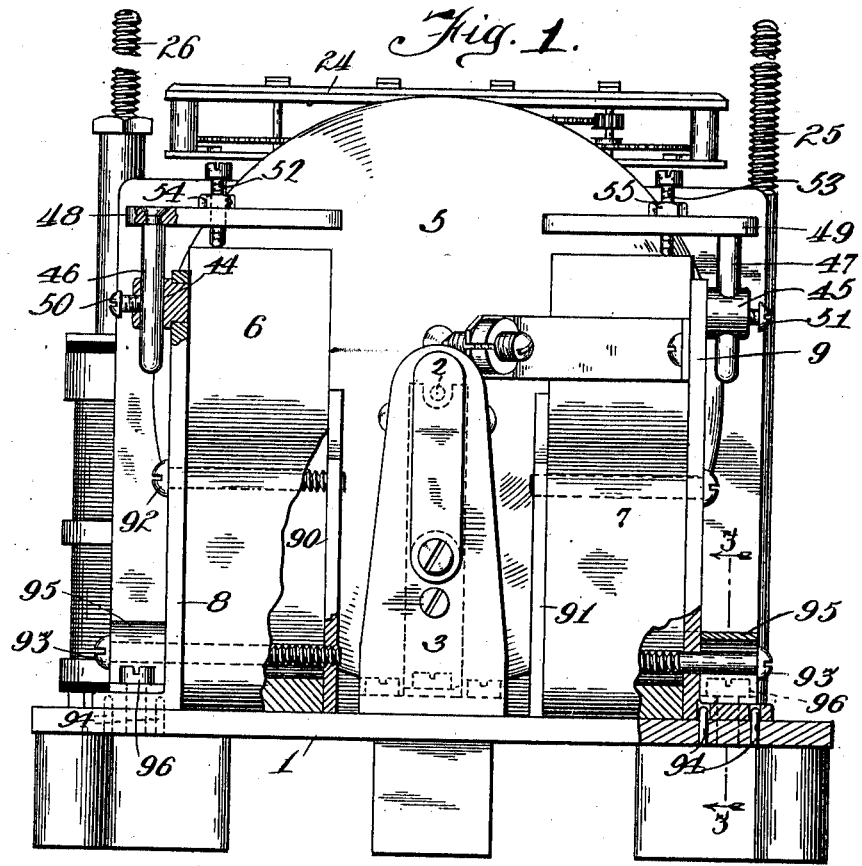
Figure 2:
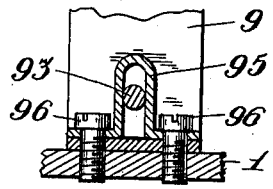

The several drawings illustrating my invention are as follows:

Figure 1 is a lower end view of the metering mechanism, showing the parts partially in section and the meter casing removed. Fig. 2 is a sectional detail view of the parts shown in Fig. 1 taken along the line 3—3.

Similar numerals refer to similar parts throughout the several views.

As shown in the drawings, the base 1 supports an armature shaft 2 in part by means of a lower bearing 3. The shaft 2 carries near its lower end a disk 5 of nonmagnetic material disposed between the poles of permanent magnets 6 and 7 held in proper position by the brackets 8 and 9 secured to the base plate 1.

Posts 25 and 26 extending outwardly from and rigidly secured to the base plate 1, are provided to secure the cover in place to protect the operating mechanism of the meter. A resistance coil 27 is disposed upon the post 26 as indicated, such resistance coil being connected in series with the armature as is the usual practice.

The brackets 8 and 9 have secured to their upper ends the studs 44 and 45 adapted to receive the round rods 46 and 47 which have secured to their upper ends the magnet shunts 48 and 49, clamping screws 50 and 51 being provided to engage the rods 46 and 47 in any desired position. The magnet shunts 48 and 49 are made preferably of soft iron and are U-shaped in order to extend on both sides of the disk 5 in a position to lie adjacent to the poles of the magnets 6 and 7, as a result of which depending upon their proximity to such poles, the shunts serve to divert the magnetic field created by the poles of the permanent magnets from passing through the retarding disk 5. Thus the binding screws 50 and 51 afford a convenient means for positively clamping the magnet shunts in any desired position and the cylindrical supports 46 and 47 afford a ready means for permitting angular adjustment of the shunts in order that they may occupy proper positions relatively to the poles of the magnets 6 and 7. Screws 52 and 53 of nonmagnetic material extend through the magnet shunts in such a manner that their ends rest upon the magnets 6 and 7 to serve as gages to determine the position of the shunts. Lock nuts 54 and 55 are provided to secure the gage screws 52 and 53 in any desired adjustment. Thus a ready means is provided for returning the magnet shunts to a previous adjustment if, for any reason, it is necessary to remove them from the brackets 8 and 9, as for example, when it is desired to remove the armature from the meter.

As indicated in Fig. 1 the magnets 6 and 7 are supported between the brackets 8 and 9 and the clamping plates 90 and 91 by means of screws 92 and 93. The brackets 8 and 9 are bent at their lower ends to engage the surface of the base plate 1 and are properly located upon such plate by means of the dowel pins 94 rigidly secured in the base plate 1 and adapted to engage suitable openings therethrough in the brackets 8 and 9. The angles thus formed in the brackets 8 and 9 are reinforced by means of bent sheet metal pieces 95 so conformed that the screws 93 pass through them and serve to clamp them rigidly to the outstanding portions of the brackets 8 and 9 when such screws are drawn up to clamp the magnets 6 and 7. The ends of the pieces 95 are adapted to receive the screws 96 by means of which such ends are securely clamped to the supporting portions of the brackets 8 and 9 at the same time that such screws 96 which pass through the supporting portions of the brackets into threaded engagement with the base plate 1 serve to positively secure such brackets in position upon such base plate, thus the pieces 95 constitute reinforcing members to remove the undue strain that might be brought upon the bent angle portions of the brackets 8 and 9 and while these pieces are shown as formed of sheet metal, it is to be understood that similar results would be secured by the use of bar metal of sufficient size to receive the screws 93 and 96 without specially forming the bar other than drilling the necessary holes to receive such screws. In this way the brackets 8 and 9 are much stiffened and the magnets 6 and 7 as well as the magnet shunts 48 and 49 are securely held in their proper operating positions.

While the structural features described are shown in the particular embodiment presented herewith, I do not wish to be limited to this exact construction but desire to claim any equivalent that may suggest itself to those skilled in the art.

What I claim is:

1. In an electric meter, a bracket for supporting part of the meter mechanism, such bracket comprising a bent bar of metal and a reinforcing corner block through which screws extend in one direction to secure the bracket to the meter base and in the other direction to secure the supported part to the bracket.

2. In an electric meter, a bracket for supporting part of the meter mechanism, such bracket comprising clamping plates, one on each side of the supported part, one of said plates bent to form a supporting surface on the meter base, and a reinforcing member in the angle of such bent plate, such reinforcing member held in position in one direction by a screw passing through the clamping plates and in the other direction by a screw passing into the meter base.

3. In an electric meter, a bracket for supporting part of the meter mechanism, such bracket comprising a bent bar of metal and a reinforcing corner block through which screws extend in one direction to secure the bracket to the meter base and in the other direction to secure the supported part to the bracket, and dowel pins for holding the bracket in position upon the meter base.

4. In an electric meter, a bracket for supporting part of the meter mechanism, such bracket comprising clamping plates, one on either side of the supported part, one of such plates bent to form a supporting surface on the meter base, a reinforcing member in the angle of such bent plate, such reinforcing member held in position in one direction by a screw passing through the clamping plates and in the other direction by a screw passing into the meter base, and dowel pins for holding the bent plate in position upon the meter base.

5. In an electric meter, a bracket for supporting part of the meter mechanism, such bracket comprising a bent bar of metal, and a reinforcing corner block through which a first screw extends to secure the bracket to the meter base and through which a second screw extends to secure the bracket to the supported part.

In witness whereof, I hereunto subscribe my name this 28th day of December, A. D. 1909.

GUSTAVE A. SCHEEFFER.

Witnesses:
ALBERT L. RABB,
JOHN E. SCOTT.

---

Copies of this patent may be obtained for five cents each, by addressing the "Commissioner of Patents, Washington, D. C."